(12) United States Patent
Wu et al.

(10) Patent No.: US 6,415,400 B1
(45) Date of Patent: Jul. 2, 2002

(54) METHOD OF MANAGING DEFECT AREAS ON AN ERASABLE OPTICAL DISC IN A DYNAMIC MANNER

(75) Inventors: Guo-Zua Wu, Taichung; Zu-Wen Chao, Hsinchu; Wei-Cheng Chen, Chang-Hua, all of (TW)

(73) Assignee: Industrial Technical Research Institute, Hsinchu (TW)

( * ) Notice: Subject to any disclaimer, the term of this patent is extended or adjusted under 35 U.S.C. 154(b) by 0 days.

(21) Appl. No.: 09/434,863

(22) Filed: Nov. 4, 1999

(30) Foreign Application Priority Data

Aug. 9, 1999 (TW) .......................................... 88113559

(51) Int. Cl.[7] .............................................. G11C 29/00
(52) U.S. Cl. ...................................... 714/723; 714/710
(58) Field of Search .................... 714/710, 711, 714/723, 763, 769, 770; 360/131, 133, 135, 77.04; 711/4, 162, 170, 171, 172, 173

(56) References Cited

U.S. PATENT DOCUMENTS

| | | | | |
|---|---|---|---|---|
| 5,392,244 A | * | 2/1995 | Jacobson et al. | 711/114 |
| 5,430,855 A | * | 7/1995 | Walsh et al. | 710/10 |
| 5,872,800 A | * | 2/1999 | Glover et al. | 714/766 |
| 6,249,888 B1 | * | 6/2001 | Sasaki et al. | 714/710 |

\* cited by examiner

*Primary Examiner*—Christine T. Tu
(74) *Attorney, Agent, or Firm*—J.C. Patents

(57) ABSTRACT

A method is proposed for managing defect areas on an erasable optical disc in a dynamic manner. By this method, a main spare area including a plurality of logical blocks is used to provide substitution logic blocks for any bad logical blocks in the user read/write area; and when all the logical blocks in the main spare area are used up, a supplementary spare area is defined from a continuous unused storage area in the user read/write area; and further, when all the logical blocks in this supplementary spare area are used up, an additional supplementary spare area is defined from another continuous unused storage area in the user read/write area; and so forth. The method allows the use of a comprehensive set of commands and data message for the communication between the file system and the optical drive when performing this management method. This method allows the optical drive to move over a shorter distance from a bad logical block to the substitution logic block so that access time to the optical disc can be enhanced. Moreover, this method allows all the bad logical blocks to have substitutions as long as the unused storage space in the formatted area is sufficient, so that this method can offer a much longer time of service than the prior art.

8 Claims, 3 Drawing Sheets

METHOD OF MANAGING DEFECT AREAS ON AN ERASABLE OPTICAL DISC IN A DYNAMIC MANNER

CROSS-REFERENCE TO RELATED APPLICATION

This application claims the priority benefit of Taiwan application serial no. 88113559, filed Aug. 9, 1999.

BACKGROUND OF THE INVENTION

1. Field of the Invention

This invention relates to optical disc technology, and more particularly, to a method of managing defect areas on an erasable optical disc in a dynamic manner.

2. Description of Related Art

An erasable optical disc is a type of data storage medium where data can be repeatedly written and erased. On an erasable optical disc, however, some part of the storage space can be damaged due to various reasons, which is no longer usable for data storage. Conventionally, defect areas can be mended by using spare areas in the other part of the same optical disc. Methods for this purpose are customarily referred to as defect management.

There are two common causes for defect areas on an optical disc: surface defect, which is customarily referred to as the first-class defect; and excessive read/write defect, which is referred to as the second-class defect. The second-class defect is customarily defined in terms of logical block; i.e., for a logical block of 16 sectors, if any one of the 16 sectors is bad, the entire logical block is marked as a bad logical block and will not be thereafter used for data storage even though the other 15 sectors are still good.

FIG. 1 is a schematic diagram used to depict a conventional method for managing defect areas on an erasable optical disc 30. As shown, this defect management method is performed by a file system 10 and an optical drive 20. The file system 10 is a software driver running on a computer system (not shown) on which the optical drive 20 is installed. The optical drive 20 includes an optical head 22, a microprocessor 24, and an interface 26. The optical drive 20 is coupled to the file system 10 via the interface 26 so that the optical drive 20 can be controlled by the file system 10 to perform read/write operations on the optical disc 30. Data and commands from the file system 10 are processed by the microprocessor 24 for controlling the optical head 22 to perform specified read/write operations on the erasable optical disc 30.

The storage space of the erasable optical disc 30 is organized into a system-dedicated read/write area 32, a formatted area 34, and a spare area 36. During normal read/write operations, data are written into the formatted area 34. However, when the formatted area 34 give rise to bad logical blocks 35, good logical blocks in the spare area 36 are used to substitute these bad logical blocks 35 (these good logical block are hereinafter referred to as substitution logic blocks), and the addresses of the substitution logic block 37 are registered in the system-dedicated read/write area 32. Both the system-dedicated read/write area 32 and the spare area 36 are reserved areas where the user is not allowed to change the data stored therein.

The procedure performed by the file system 10 and the optical drive 20 for managing the bad logical blocks on the erasable optical disc 30 includes the following steps.

(Step 1)

After the erasable optical disc 30 is inserted in position in the optical drive 20, the microprocessor 24 first commands the optical head 22 to move to the system-dedicated read/write area 32 to read the addresses of the bad logical blocks 35 in the formatted area 34 and the addresses of their substitution logic blocks 37 in the spare area 36. The micro-processor 24 then stores these address data in the internal registers thereof.

(Step 2)

During read/write operation, when the optical head 22 encounters a bad logical block in the formatted area 34, it promptly informs the microprocessor 24 of this condition.

(Step 3)

In response, the microprocessor 24 checks whether the currently-encountered bad logical block is an old one or not, i.e., whether it was previously found and is already registered in the system-dedicated read/write area 32, by checking whether it matches to any of the address data currently held in the internal register of the microprocessor 24. If YES, the procedure jumps to the step (6); otherwise, if NOT, it indicates that this bad logical block is a newly produced one, and the microprocessor 24 sends a request signal via the interface 26 to the file system 10.

(Step 4)

In response to this request, the file system 10 proposes a mending method for this newly-produced bad logical block, and then sends the mending method back via the interface 26 to the microprocessor 24.

(Step 5)

In response, the microprocessor 24 first checks that if the spare area 36 still have sufficient storage space to substitute for this newly-produced bad logical block; and if YES, the microprocessor 24 selects a good logical block to serve as the substitution logic block 37 for the bad logical block, and then fetches the address of this substitution logic block 37. The microprocessor 24 then commands the optical head 22 to write the address of the substitution logic block into the system-dedicated read/write area 32. And then, the system 10 goes to Step 7.

(Step 6)

As the address of the substitution logic block 37 is set, the microprocessor 24 drives the optical head 22 to move from the currently-encountered defect area to the substitution logic block 37 in the spare area 36, an d then write d at a into the substitution logic block.

(Step 7)

After the write operation is completed, the microprocessor 24 sends an OK signal via the interface 26 to th e file system 10.

(Step 8)

In response, the file system 10 display a message to the user, telling that the write operation is completed. The user can then remove the optical disc 30 from the optical drive 20. After the optical disc 30 is removed, the microprocessor 24 clears its internal register for those address of the substitution logic block 37.

In the foregoing procedure, the communication between the file system 10 and the optical drive 20 requires a comprehensive set of commands and data signals for effective management of the defect areas on the optical disc 30. The prior art, however, is considered insufficient in this respect.

Moreover, the spare area 36 in the optical disc 30 is fixed in size when being formatted. During read/write operation, when the optical drive 20 encounters a bad logical block, it will move to the spare area 36 and find a good logical block there to serve as a substitution for the currently-encountered bad logical block. This action is customarily referred to as linear replacement. In the prior art, the starting and ending addresses of the spare area 36 are all fixed and cannot be dynamically varied.

The fixed-size scheme for the spare area 36, however, has the following draw-backs.

First, it would make the substitution logic block in the repair areas 37 separated far away from the corresponding bad logic block in the formatted area 34, which would cause the optical head 22 to move a long distance from the bad logical block to the substitution logic block. As a result, the access time is increased.

Second, it is possible that the spare area 36 would give rise to bad logical blocks after the optical disc 30 has been repeatedly accessed for many times. Should this be the case, there would be no substitution logical blocks available to serve as substitutions for these newly-produced bad logical blocks in the spare area 36; and therefore, the spare area 36 may eventually become insufficient to serve its purpose. When this happens, the optical disc 30 would be no longer capable of mending any bad logical blocks in the formatted area 34. The prior art thus can only provide a limited period of service for the management of defect areas on the optical disc 30.

SUMMARY OF THE INVENTION

It is at least an objective of this invention to provide a method of managing defect areas on an erasable optical disc. The method can dynamically assign and find out a supplementary spare area residing in the formatted area, so that the spare area can be more efficiently managed It is another objective of this invention to provide a method of managing defect areas on an erasable optical disc, which allows the file system and the optical drive to communicate with each other with a comprehensive set of commands and data signals which allow the management to be performed more dynamically and efficiently than the prior art.

It is still another objective of this invention to provide a method of managing defect areas on an erasable optical disc, which allows the access operation to the optical disc to be performed more quickly than the prior art by reducing the time required to move the optical head from a bad logical block to the substitution one.

It is still another objective of this invention to provide a method of managing defect areas on an erasable optical disc, which can be used for a long time even though the number of bad logical blocks on the optical disc is ever increasing.

In accordance with the foregoing and other objectives, the invention proposes a new method for managing defect areas on an erasable optical disc.

The method of the invention includes the following steps: (1) partitioning the optical disc into a formatted area and an unformatted area; and then partitioning the formatted area into a main spare area and a user read/write area, where the main spare area including a plurality of substitution logic blocks which can be selected to serve as a substitution for a bad logical block in the user read/write area, if found; the starting and ending addresses of each bad logical block and its substitution logic block being registered in the unformatted area; (2) when all the good logical blocks in the main spare area are used up, defining a supplementary spare area in the user read/write area, and registering the starting and ending addresses of this supplementary spare area in the unformatted area; (3) when an additional bad logical block is found in the user read/write area, selecting a good logical block from the supplementary spare area to serve as a substitution for this newly-found bad logical block; and then registering the address of this newly-found bad logical block and the address of the substitution logic block into the unformatted area; and (4) repeating the steps (2) and (3) if all the good logical blocks in the current supplementary spare area are used up and an additional bad logical block is found.

Alternatively, the invention can be defined in such a manner as to be used in conjunction with a file system and an optical drive. In this respect, the method of the invention includes the following steps: (1) actuating the optical drive to partition the optical disc into a formatted area and an unformatted area, and then partition the formatted area into a main spare area and a user read/write area, where the main spare area including a plurality of logic blocks which can be selected to serve as a substitution for a bad logical block in the user read/write area, if found; the starting and ending addresses of each bad logical block and its substitution logic block being registered in the unformatted area; (2) when the good logical blocks in the main spare area are used up, actuating the optical drive to define a supplementary spare area in the user read/write area, and registering the starting and ending addresses of this supplementary spare area in the unformatted area; (3) when an additional bad logical block is found in the user read/write area, actuating the optical drive to select a good logical block from the supplementary spare area to serve as a substitution for this newly-found bad logical block; and then registering the address of this newly-found bad logical block and the address of the substitution logic block into the unformatted area; and (4) actuating the optical drive to repeat the steps (2) and (3) if the good logical blocks in the current supplementary spare area are used up and an additional bad logical block is found.

Defined in a more restricted manner, the method of the invention includes the following steps: (1) actuating the optical drive to partition the optical disc into a formatted area and an unformatted area, and then partition the formatted area into a main spare area and a user read/write area, where the main spare area including a plurality of substitution logic blocks which can be selected to substitute a bad logical block in the user read/write area, if found; the starting and ending addresses of each bad logical block and its substitution logic block being registered in the unformatted area; (2) when the good logical blocks in the main spare area are used up, actuating the optical drive to issue a request to the file system for finding a continuous unused storage area in the user read/write area; (3) actuating the optical drive to send an address signal indicative of the starting and ending addresses of all the available continuous unused storage areas on the optical disc; (4) actuating the optical drive to send an address signal indicative of the starting and ending addresses of every currently-defined supplementary spare area on the optical disc; (5) actuating the file system to define a supplementary spare area from a continuous unused storage area and send an address signal indicative of the starting and ending addresses of this supplementary spare area to the optical drive; (6) actuating the file system to write the starting and ending addresses of the newly-defined supplementary spare area into the unformatted area of the optical disc; (7) when the good logical blocks in the main spare area are used up, actuating the optical drive to use the newly-defined supplementary spare area in place of the main spare area; (8) when an additional bad logical block is found in the user read/write area, actuating the optical drive to select a good logical block from the supplementary spare area to serve as a substitution for this bad logical block; and then registering the address of this newly-found bad logical block and the address of the corresponding substitution logic block into the unformatted area; and (9) jumping to the step (2) if the good logical blocks in the current supplementary spare area are used up and an additional bad logical block is found.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

In accordance with the invention, a new spare area includes a main spare area and a supplementary spare area, where the main spare area is located at the unformatted area and the supplementary spare area is located at the formatted area. The main spare area includes a plurality of logical blocks, which are used to substitute logic blocks for any bad ones occurring in the user read/write area. The user read/write area is also located at the formatted area. When all the logical blocks in the main spare area are going to be used up, a supplementary spare area is defined from a continuous unused storage area in the user read/write area; and further, when all the logical blocks in this supplementary spare area are used up, an additional supplementary spare area is defined from another continuous unused storage area in the user read/write area; and so forth. The method of the invention is performed in a dynamic manner, which means that, whenever the logic blocks in a supplementary spare area are used up, a new one is instantly defined, and which is unrestricted in size.

Figure 1:
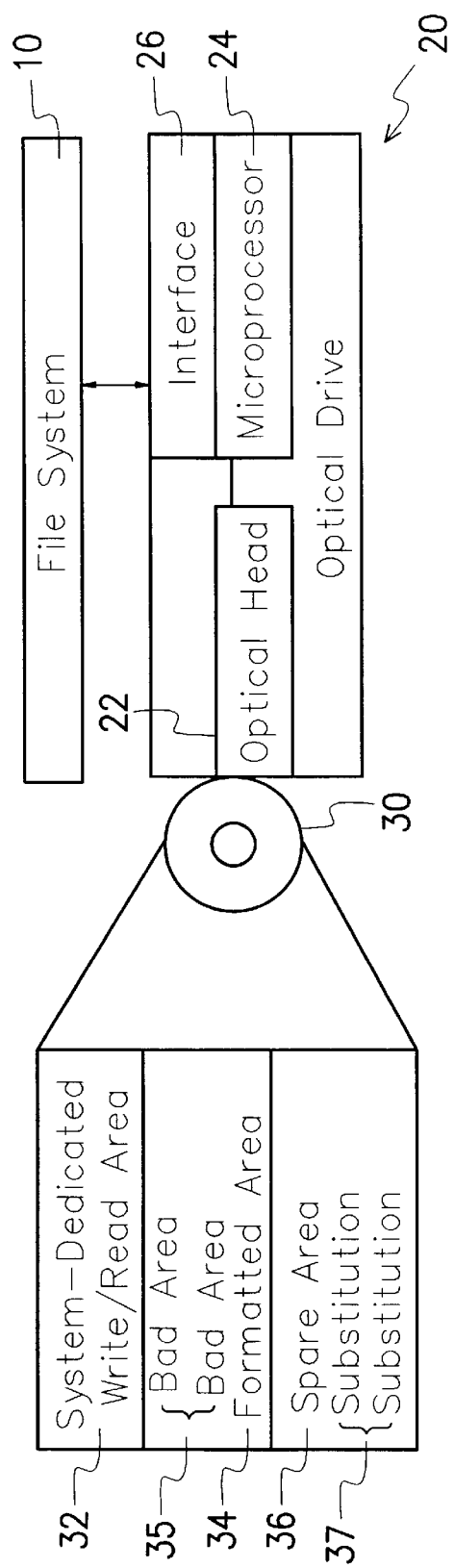
FIG. 1 is a schematic diagram used to depict a conventional method for managing defect areas on an erasable optical disc.
Figure 2:
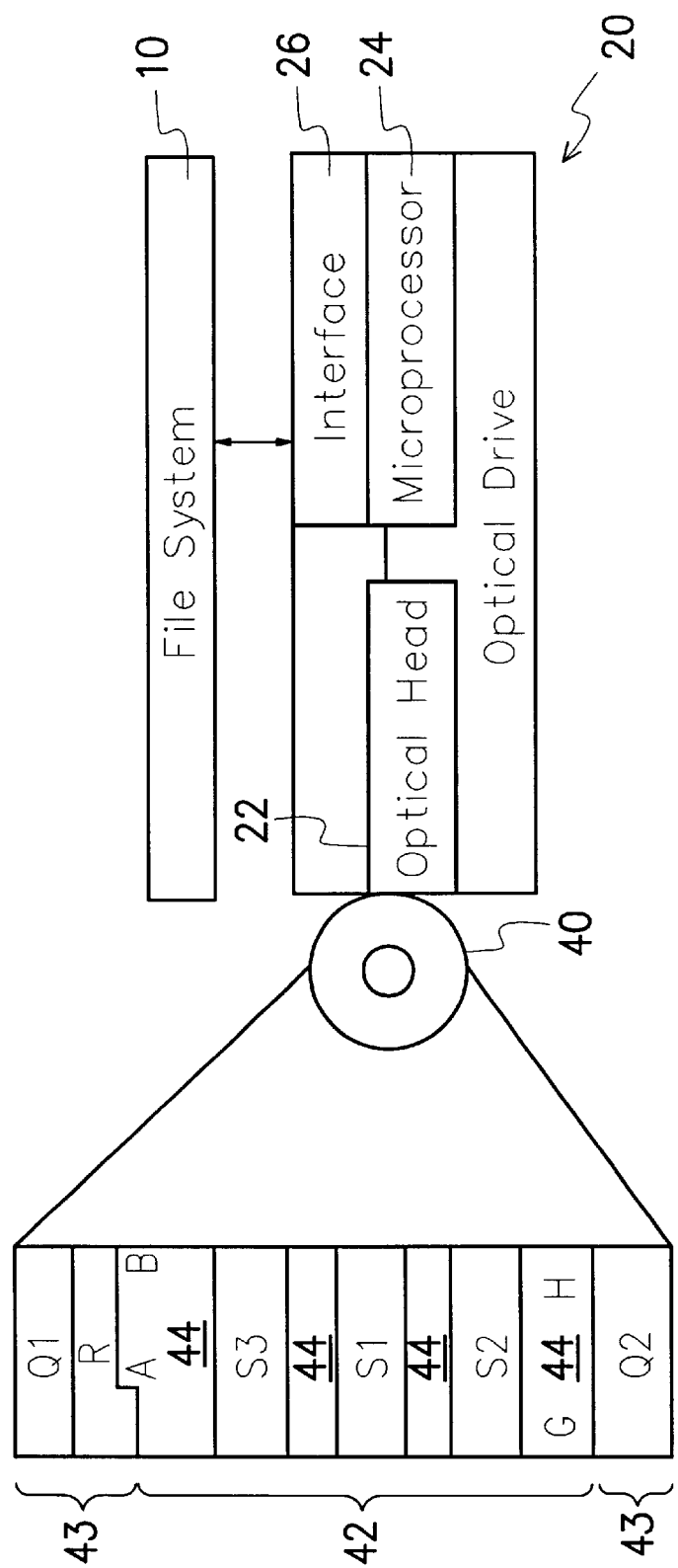
FIG. 2 is a schematic diagram used to depict the method according to the invention for managing defect areas on an erasable optical disc.

FIG. 2 is a schematic diagram used to depict the method according to the invention for managing defect areas on an erasable optical disc 40. In this preferred embodiment, the software/hardware environment for performing the method of the invention is the same as the prior art depicted in FIG. 1, which includes a file system 10 and an optical drive 20; and wherein the optical drive 20 includes an optical head 22, a microprocessor 24, and an interface 26.

During formatting, the optical disc 40 is partitioned into a formatted area 42 and an unformatted area 43. In the FIG. 2, for example, the formatted area 42 includes the area ABGH. The unformatted area 43 is divided into a main spare area R and two separate segments Q1, Q2, called as a system read/write area, particularly used by the system 10 for registering the addresses of the defective logic blocks and the substitution addresses of the substituted logic blocks. The starting address and the ending address, referring to the supplementary spare area at the formatted area 42, are also registered in the system read/write area.

Moreover, the formatted area 42 is partitioned into a supplementary spare area S1–S3 and a user read/write area 44. In the case of FIG. 2, for example, the main spare area is the area denoted by R, including at least one region, and the user read/write area includes at least one segment indicated by the reference numeral 44. In accordance with the invention, the at least supplementary spare area is defined when all the logical blocks in the main spare area R are used up. In the case of FIG. 2, for example, three supplementary spare areas respectively denoted by S1, S2, and S3 are defined. The system read/write area is used to register the following pieces of information: the starting and ending addresses of each bad logical block in the formatted area 42; the starting and ending addresses of each substitution logic block in the main spare area R or the supplementary spare areas; and the starting and ending addresses of each supplementary spare area at the of formatted area 42. The main spare area R is used to mend all the bad logical blocks of the first-class defect and part of the bad logical blocks of the second-class defect. In accordance with the invention, when all the good logical blocks in the main spare area R are used up, a supplementary spare area S1 will be defined; otherwise, no supplementary spare area will be defined. Afterwards, when all the logical blocks in the firstly-defined supplementary spare area S1 are used up, a second supplementary spare area S2 will be defined; and when all the logical blocks in the secondly-defined supplementary spare area S2 are used up, a third supplementary spare area S3 will be defined; and so forth. In accordance with the invention, all of these supplementary spare areas S1, S2, S3 are unrestricted in size, order, and the starting and ending addresses; in other words, they can be dynamically allocated based on the available storage space on the optical disc 40. Within the formatted area 42, all the segments other than the main spare area R and the supplementary spare area S1, S2, S3, i.e., the blocks indicated by the reference numeral 44, are collectively used as the user read/write area where data can be written thereto.

Figure 3A:
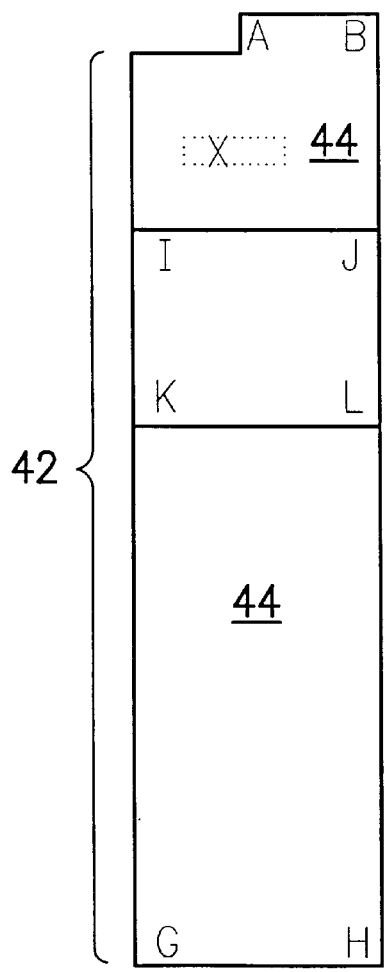
FIGS. 3A–3B are schematic diagrams used to depict an example of using the method of the invention for managing bad logical blocks on an erasable optical disc.
Figure 3B:
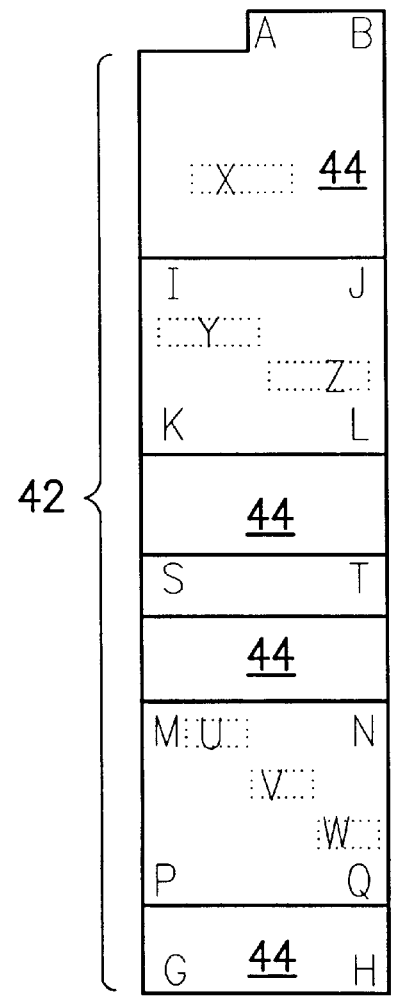

FIGS. 3A–3B are schematic diagrams used to depict an example of using the method of the invention for managing bad logical blocks on the erasable optical disc 40.

In FIG. 3A, the letter A denotes the starting sector of the logical block that is nearest to the center of the optical disc 40; H denotes the ending sector of the logical block that is nearest to the rim of the optical disc 40; B, J, and L denote the respective ending sectors of some intermediate logical blocks in the formatted area 42; and I, K, and G denote the respective starting sectors of some intermediate logical blocks in the formatted area 42.

When a bad logical block occurs at the user read/write area 44, a good logic block in the main spare area R is selected as a substitution, such as a linear replacement, for this bad logical block. The bad logical block is also conventionally called a second class defect. Meanwhile, the address of the bad logical block and the address of the substitution logic block are registered in the unformatted area 43 at the system read/write area R.

Afterwards, when all the available logical blocks in the main spare area R are used up, the optical drive 20 will inform the file system 10 of this condition. In response, the file system 10 checks the entire storage space of the optical disc 40 for any continuous unused storage area having no bad logical blocks, and utilizes it as a supplementary spare area. In the case of FIG. 3A, for example, the area IJKL is found to be an unused storage area having no bad logical blocks, and is thus assigned as a supplementary spare area. The area IJKL preferably is continuous to the previously used user read/write area. The starting and ending addresses of this supplementary spare area IJKL are then registered in the unformatted area 43 at the system read/write area R.

For example, during further operations, another bad logical block, as denoted by X in FIG. 3A, is found. In this case, a good logical block in the supplementary spare area IJKL is selected as a substitution for the bad logical block X; and the address of the bad logical block X and the address of the substitution logic block in the supplementary spare area IJKL are registered in the unformatted area 43 at the system read/write area R.

It is a characteristic feature of the invention that the substitution logic block for the bad logical block X is located in the supplementary spare area IJKL which is located next to the user read/write area 44 where the bad logical block X is found. This feature allows the optical head to move from the bad logical block X to the substitution logic block by a reduced distance as compared to the prior art, thus allowing the access time to the optical disc 40 to be faster than the prior art.

Referring next to FIG. 3B, after the optical head 22 has been repeatedly accessed for a great many times, the supplementary spare area IJKL could also give rise to bad logical blocks of the second-class defect, for example the areas denoted by Y and Z. This reduces the number of good logical blocks in the supplementary spare area IJKL. As the good logical blocks in the supplementary spare area IJKL are used up, the optical drive 20 will instantly inform the file system 10 of this condition and request the file system 10 to check the entire storage space of the optical disc 40 for a continuous unused storage area having no bad logical blocks. If a continuous unused storage area is found, it is used as an additional supplementary spare area (hereinafter referred to as the second supplementary spare area). In the case of FIG. 3B, for example, the area MNPQ is found to be a continuous unused storage area having no bad logical blocks, and is thus assigned as the second supplementary spare area. The starting and ending addresses of the second supplementary spare area MNPQ are then registered in the unformatted area 43.

As the optical disc 40 has been used for a long time, the second supplementary spare area MNPQ could also give rise to bad logical blocks of the second-class defect, for example the areas denoted by U, V and W. This reduces the number of good logical blocks in the second supplementary spare area MNPQ. As the good logical blocks in the second supplementary spare area MNPQ are used up, the optical drive 20 will instantly inform the file system 10 of this condition and requests the file system 10 to check the entire storage space of the optical disc 40 for another continuous unused storage area having no bad logical blocks. If a continuous unused storage area is found, it is used as an additional supplementary spare area (hereinafter referred to as the third supplementary spare area). In the case of FIG. 3B, for example, the area ST is found to be a continuous unused storage area having no bad logical blocks, and is thus assigned as the third supplementary spare area. The starting and ending addresses of the third supplementary spare area ST are then registered in the unformatted area 43 at the system read/write area R.

Generally speaking, whenever all the good logical blocks in the lastly-defined supplementary spare area are used up, the foregoing procedure is repeated once again to define an additional supplementary spare area from any continuous unused storage area in the formatted area 42. This allows all the bad logical blocks to have substitutions as long as the unused storage space in the formatted area 42 is sufficient.

Using the method of the invention, the communication between the file system 10 and the optical drive 20 can be achieved by using a comprehensive set of commands and data signals as follows:

(a) an address message indicative of the starting and ending addresses of each continuous unused storage area having no bad logical blocks, which is transferred from the optical drive 20 to the file system 10.

(b) a request for defining a new supplementary spare area, which is issued from the optical drive 20 to the file system 10.

(c) an address message indicative of the starting and ending addresses of every supplementary spare area currently defined on the optical disc 40, which is transferred from the optical drive 20 to the file system 10.

(d) an address message indicative of the starting and ending addresses of a newly-defined supplementary spare area in response to the request from the optical drive 20, which is transferred from the file system 10 to the optical drive 20. The starting and ending addresses are not fixed.

(e) a command issued by the file system 10 to the optical drive 20, which commands the optical drive 20 to write the starting and ending addresses of the newly-defined supplementary spare area into the unformatted area 43 of the optical disc 40.

In conclusion, the invention provides a method for managing defect areas on an erasable optical disc in a dynamic manner, which can allocate a new supplementary spare area at the formatted area 42 whenever the logical blocks in the main spare area or the currently-used supplementary spare area are used up, so that bad logical blocks can always find substitutions from the newly-defined supplementary spare area.

The method of the invention has the following advantages over the prior art.

First, the method of the invention allows the management on the bad logical blocks to be performed in a dynamic and efficient manner with the use of a comprehensive set of commands and data message for communication between the file system and the optical drive.

Second, the method of the invention allows the optical drive to move from a bad logical block to the substitution one over a shorter distance than the prior art, thus allowing the access time to be reduced as compared to the prior art.

Third, the method of the invention allows all the bad logical blocks to find substitutions as long as the unused storage space in the formatted area is sufficient, so that the invention can offer a much longer time of service than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for use on an optical drive controlled by a file system for managing defect areas on an erasable optical disc, the method comprising the steps of:

actuating the optical drive to partition the optical disc into a formatted area and an unformatted area, and then partition the unformatted area into a main spare area and a system read/write area, where the formatted area serves as a user read/write area, and the main spare area of the unformatted area includes a plurality of substitution logic blocks which can be selected to substitute for a bad logical block occurring in the user read/write area, wherein if a bad logical block is found, starting/ ending addresses of the bad logical block and its corresponding one in the substitution logic blocks are registered in the system read/write area; and when the substitution logical blocks in the main spare area are going to be used up, performing following steps:
(1) the optical drive informing the file system to open a new supplementary spare area;
(2) the optical drive providing the file system with starting/ending addresses of all currently available unused storage areas having no defect in the user read/write area;
(3) the optical drive providing the file system with starting/ending addresses of all currently opened supplementary spare areas in the user read/write area;
(4) the file system defining starting/ending address of the new supplementary spare area from the currently available unused storage areas, and sending the starting/ending addresses of the new supplementary spare areas to the optical drive;
(5) the file system instructing the optical drive to start writing the starting/ending addresses of the new supplementary spare area into the system read/write area of the unformatted area;
(6) the optical drive indicating out the new supplementary area from the user read/write area, and writing the starting/ending addresses of the new supplementary spare area into the system read/write area, wherein the new supplementary spare area includes a plurality of logic blocks;
(7) when a new bad logic block occurs later in the user read/write area, the optic drive using logic blocks belonging to the new supplementary spare area to sequentially substitute the new bad logic block, and the optical drive writing substituted starting/ending addresses of the substituted logic blocks into the system read/write area, wherein a judgment to see whether or not the logic blocks belonging to the new supplementary spare area are going to be used up;
(8) jumping to the step (7), if the judgement is negative; and
(9) jumping to the step (1), if the judgement is positive.

2. The method of claim 1, wherein the judgement of the step (7) is used to properly allocate more logic blocks for substituting the bad logic block in time.

3. The method of claim 1, wherein in the step (1), the optical drive informing the file system through a manner is done through a manner comprising sending a command or an instruction.

4. The method of claim 1, wherein in the step (2), the optical drive providing the file system with the starting/ending addresses is done through a manner comprising sending a command or an instruction.

5. The method of claim 1, wherein in the step (3), the optical drive providing the file system with the starting/ending addresses is done through a manner comprising sending a command or an instruction.

6. The method of claim 1, wherein in the step (4), the file system sending the starting/ending address to the optical drive is done through a manner comprising sending a command or an instruction.

7. The method of claim 1, wherein in the step (4), the new supplementary spare area is continuous to a previously used area in the user read/write area, and includes a plurality of logic blocks to be used for substitution.

8. The method of claim 1, wherein in the step (5), the file system instructing the optical drive is done through a manner comprising sending a command or an instruction.

* * * * *